(12) United States Patent
Yamamoto

(10) Patent No.: US 6,542,172 B1
(45) Date of Patent: Apr. 1, 2003

(54) METHOD AND RECORDING MEDIUM FOR AGGREGATING INDEPENDENT OBJECTS

(75) Inventor: Katsuhiro Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/264,995

(22) Filed: Mar. 9, 1999

(30) Foreign Application Priority Data

Mar. 9, 1998 (JP) .......................................... 10-056494

(51) Int. Cl.[7] ................................................ G09G 5/00
(52) U.S. Cl. ....................... 345/837; 345/759; 345/761; 345/798; 345/825
(58) Field of Search ............................. 717/1; 395/346; 345/418, 837, 759, 761, 764, 798, 825; 358/404

(56) References Cited

U.S. PATENT DOCUMENTS

| | | | | |
|---|---|---|---|---|
| 5,583,539 A | * | 12/1996 | Hiketa et al. ................ | 345/146 |
| 5,694,561 A | * | 12/1997 | Malamud et al. ............ | 395/346 |
| 6,189,138 B1 | * | 2/2001 | Fowlow et al. ................ | 717/1 |
| 6,191,787 B1 | * | 2/2001 | Lu et al. ...................... | 345/418 |
| 6,211,966 B1 | * | 4/2001 | Osada et al. ................. | 358/404 |

* cited by examiner

*Primary Examiner*—Kristine Kincaid
*Assistant Examiner*—Mylinh Tran

(57) ABSTRACT

A data generating method for aggregating a plurality of edit objects as an aggregate object in a visual programming operation so as to improve editing efficiency. A plurality of objects are aggregated and displayed as one aggregate object. If edit objects overlap each other at the same position, they can be created one after the other and placed in an aggregate object. In addition, substances of individual menus on a menu operation tree can be placed in an aggregate object. An aggregate object has an operation menu that has controls for validating/invalidating the generation of data. When a plurality of objects are placed in an aggregate object, by validating the objects one after the other, different layouts can be easily created and compared.

12 Claims, 5 Drawing Sheets

METHOD AND RECORDING MEDIUM FOR AGGREGATING INDEPENDENT OBJECTS

BACKGROUND OF THE INVENTION

The present invention relates to a data generating method for generating a program corresponding to software parts designed in a drawing area so as to form a graphic user interface environment. The present invention also relates to a recording medium for storing a program for such a data generating method.

Various operation systems using graphical images and windows as well as characters have been proposed so as to allow users to intuitively and simply operate personal computers. These operation systems are programmed so that the user can select each icon and each menu with a mouse so as to cause the personal computer to perform each operation and each process. An environment that allows the user to easily operate a personal computer using graphic images and windows as well as characters is typically referred to as a GUI (Graphical User Interface).

To form particular screen information for the GUI environment, a visual programming method that allows the user to easily program characters, graphic images, and windows corresponding to processes has been used.

In the visual programming method, a form that is a particular display format and an object (software part) composed of a control or the like for performing a particular process are defined in such a manner that a particular process is performed corresponding to an occurrence of a particular event. In this case, an event means a user's operation such as a clicking operation, a dragging operation of a pointing device, such as a mouse, or a key operation of a keyboard.

When a form and an object are programmed, an object editor screen (editing screen) is displayed and an editing mode is set. When software parts are designed in a drawing area of the editing screen, programs for displaying the software part and various processes thereof are coded. In other words, labels and controls as objects are placed in a particular drawing area. The labels and controls are designed in detail and coded when necessary.

However, in the conventional visual programming method, when software parts are placed at the same position, since they overlap each other, they cannot be separately displayed. In addition, when there are many objects, it is difficult to display all of the objects. Moreover, substances of menus cannot be placed on an operation menu tree.

SUMMARY OF THE INVENTION

A first aspect of the present invention is a data generating method for designing software parts in a drawing area and generating a program for displaying the designed software parts, comprising the steps of aggregating the designed software parts as an aggregate object, and treating the aggregate object as an object on the screen.

A second aspect of the present invention is a recording medium from which a computer reads software information for designing software parts in a drawing area and generating a program for displaying the designed software parts, the software information causing the computer to perform the functions of aggregating designed software parts as an aggregate object, and treating the aggregate object as an object on the screen.

According to the present invention, since an aggregate object that aggregates software parts is used, objects placed at the same position can be displayed. In addition, many objects can be displayed at a time. Moreover, substances of individual menus can be placed on a menu operation tree.

Thus, according to the present invention, since a plurality of software parts are selectively aggregated as an aggregate object, even if objects to be edited overlap each other at the same position, each tag screen can be displayed. In addition, when many objects are laid out, they can be displayed at a time.

When individual menus on a menu operation tree are treated as aggregate objects, substances of discrete menus can be placed in the individual aggregate objects.

Each aggregate object has an operation menu with a control that represents validation/invalidation of data generation. Thus, software parts that slightly vary with each other are aggregated. Each software part that is validated is laid out. By comparing each layout, an editing operation can be effectively performed.

These and other objects, features and advantages of the present invention will become more apparent in light of the following detailed description of a best mode embodiment thereof, as illustrated in the accompanying drawings.

DETAILED DESCRIPTION

Figure 1:
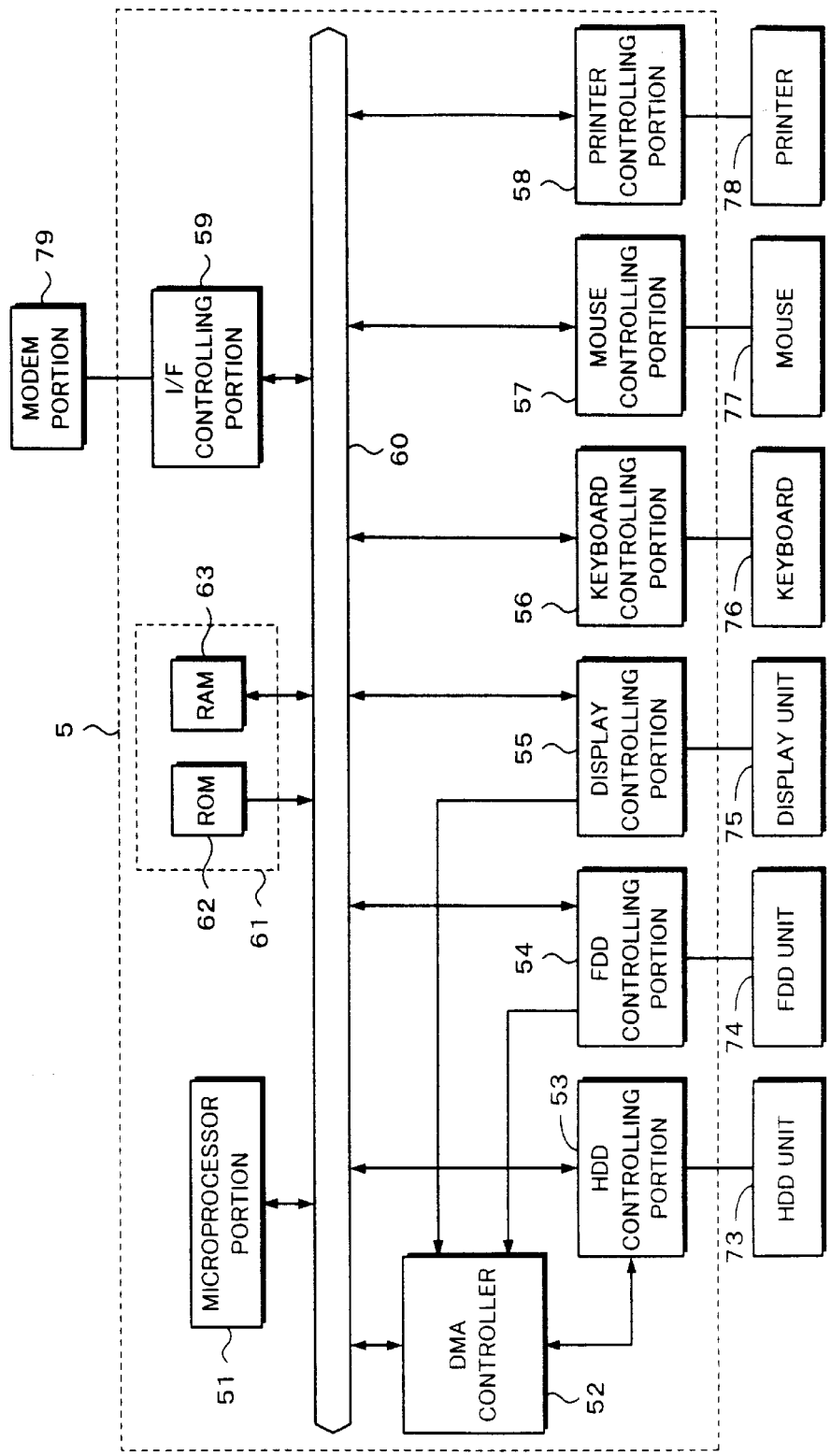
FIG. 1 is a block diagram showing an example of the structure of a personal computer according to the present invention.

With reference to the accompanying drawings, an embodiment of the present invention will be described. In the embodiment, a conventional personal computer as shown in FIG. 1 will be described. In FIG. 1, reference numeral 5 is the main body of the personal computer. The main body 5 of the personal computer comprises a micro processor portion 51, a memory portion 61, a DMA (Direct Memory Access) controller 52, a HDD (Hard Disk Drive) controlling portion 53, a FDD (Floppy Disk Drive) controlling portion 54, a display controlling portion 55, a keyboard controlling portion 56, a mouse controlling portion 57, a printer controlling portion 58, an interface controlling portion 59, and a bus 60. The memory portion 61 is composed of a ROM 62 and a RAM 63. An HDD unit 73 is connected to the HDD controlling portion 53. An FDD unit 74 is connected to the FDD controlling portion 54. A display unit 75 is connected to the display controlling portion 55. A keyboard 76 is connected to the keyboard controlling portion 56. A mouse 77 is connected to the mouse controlling portion 57. A printer 78 is connected to the printer controlling portion 58. A modem portion 79 is connected to the interface controlling portion 59. The display controlling portion 5 has a memory portion composed of a VRAM, a Kanji ROM, and so forth.

Each structural portion of the main body 5 of the personal computer is connected through the bus 60 so as to exchange data. In addition, the DMA controller 52 is connected to the HDD controlling portion 53, the FDD controlling portion 54, and the display controlling portion 55 so as to directly exchange data as with the memory portion 61.

When an external input unit such as the keyboard 76 or the mouse 77 is operated and each mode is set, a program is read from the memory portion 61 and when necessary from the HDD unit 74 and the FDD unit 73. Each process is performed in a predetermined manner corresponding to the program.

When a visual programming operation is performed, visual programming application software that has been installed in the main body 5 of the personal computer is executed. Thereafter, an object editor screen is displayed and an editing mode is set. When a software part is designed in a drawing area, programs for displaying the software part and various processes thereof are coded.

In other words, labels and controls (command buttons) as software parts are placed in a predetermined drawing area. The labels and controls are designed in detail. When necessary, the labels and controls are coded. The designed screen is displayed as a real screen on a display portion. Thus, a GUI environment is formed. As will be described later, when a plurality of software parts are edited and placed at the same position, since it is difficult to compare them, an object aggregating process is performed.

Figure 2:
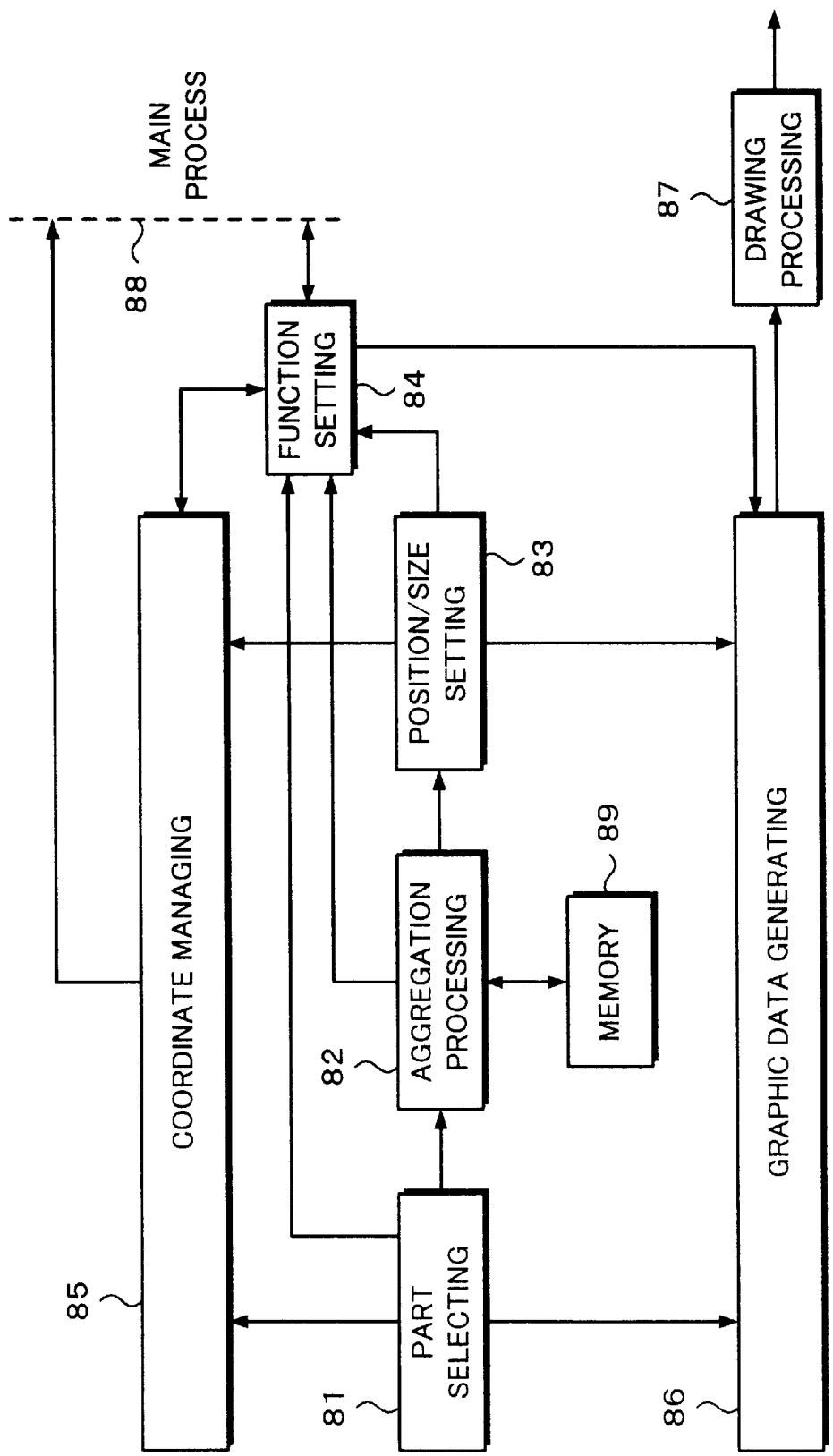
FIG. 2 is a block diagram showing a function according to the present invention.

FIG. 2 is a block diagram showing structural portions accomplished by software installed in the main body 5 of the personal computer corresponding to the embodiment of the present invention. In FIG. 2, reference numeral 81 is a part selecting portion. With an operation of an external input unit such as the keyboard 76 and the mouse 77, the object editor screen is displayed and the editing mode is set.

A drawing area in which a part can be placed is displayed and a part selecting process is performed. For example, labels for displaying characters in a drawing area and controls such as command buttons for designating a button operation recognizing area are selected from a tool box in a predetermined drawing area and placed at desired positions with operations of the mouse 77. When the positions of the labels and controls are confirmed with the mouse 77, the part selecting portion 81 generates part information that represents the selected parts and the positions thereof. The part information is supplied to a coordinate managing portion 85. The part information is also supplied to a graphic data generating portion 86 and a function setting portion 84.

Figure 3:
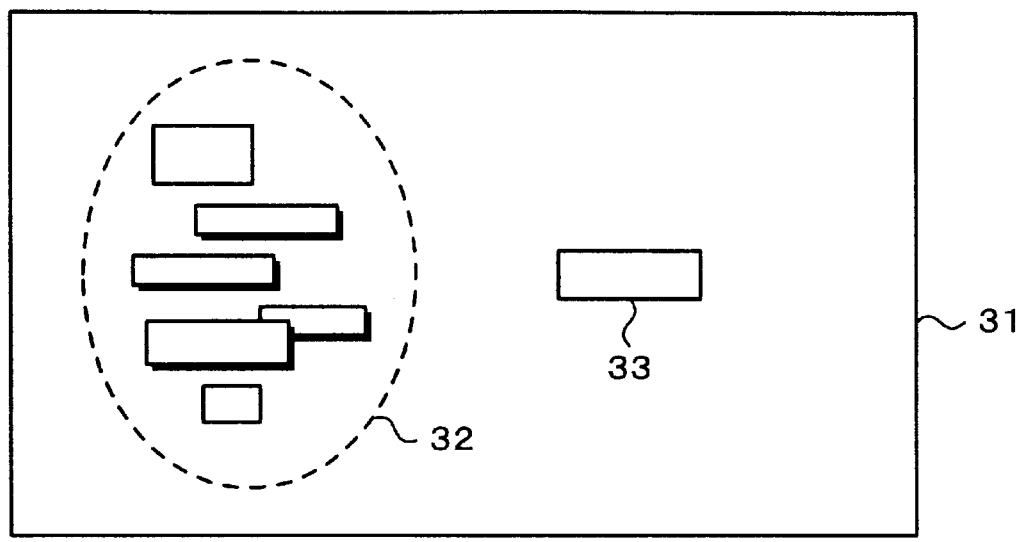
FIG. 3 is a schematic diagram showing an example of a screen according to the present invention.

When a plurality of software parts are placed (overlap each other) at the same positions and it is difficult to compare them, an aggregating process is performed by an aggregation processing portion 82. For example, it is assumed that an editing operation is performed on an editing screen (window) 31 shown in FIG. 3. In FIG. 3, a plurality of objects are surrounded by a dashed line 32. The dashed line 32 is not actually drawn.

The user selects (marks) objects as an aggregate object by clicking the mouse 77. When the user clicks an aggregation button of the menu, an aggregate object 33 is displayed on the editing screen 31. Thus, objects on the editing screen 31 are scanned and the selected (marked) objects are aggregated as an aggregate object. The aggregating process is performed in such a manner.

Alternatively, when the user clicks the aggregation button, an aggregate object 33 that is blank is displayed. The user selects (marks) desired objects to be aggregated from a plurality of objects 32. The marked objects are placed in the aggregate object 33.

In the editing process, an aggregate object 33 is treated as one object. In other words, a plurality of aggregate objects 33 can be set. The position and size of each aggregate object 33 can be freely set.

Data generated in the aggregating process and pre-aggregated data are correlated as aggregation information and stored in one folder of the memory 89. In addition, the aggregation information is supplied to a function setting portion 84 and a position/size setting portion 83.

Figure 4:
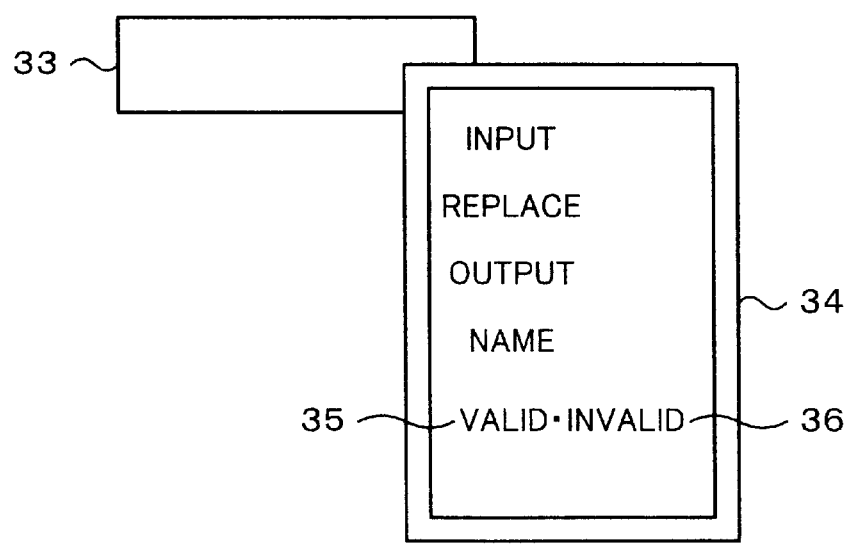
FIG. 4 is a schematic diagram showing an example of a menu of an aggregate object according to the present invention.

Each aggregate object 33 has a pull-down type operation menu 34 as shown in FIG. 4. The operation menu 34 has operation buttons "input", "replace", "output", "name", and "valid/invalid". The operation button "input" is used to place a selected object (part) in the aggregate object 33. The operation button "replace" is used to replace an existing object with a new object. The operation button "output" is used to output (reproduce) an object. The operation button "name" is used to name the aggregate object 33. The operation button "valid/invalid" is used to validate/invalidate the generation of data. When a valid button 35 is pressed, data is generated. When an invalid button 36 is pressed, data is not generated.

Data of the aggregating process is generated corresponding to an operation and a process corresponding to a selected operation on the menu. Aggregation information composed of data generated in the aggregating process and pre-aggregated data is stored in the memory 89. Edit data is managed corresponding to the aggregation information.

After the aggregating process is completed, the position/size setting portion 83 places the aggregate object at a desired position in the drawing area and sets the size of the aggregate object. After the position and the size of the aggregate object have been set, the position/size setting portion 83 generates position/size information and supplies it to the coordinate managing portion 85 and the graphic data generating portion 86.

After the screen designing process including the aggregate process has been completed, when necessary, a function setting process for objects such as controls in the drawing area is performed. In other words, objects such as controls in the drawing areas are coded so that processes corresponding to events against objects are defined. For example, a program that causes predetermined data to be read from the memory 89 or the memory portion 61 and to be displayed corresponding to a clicking operation of the mouse 77 against a command button in a predetermined position is input. After the function setting process has been completed, the function setting portion 84 generates function information. The function information is supplied to the coordinate managing portion 85. In addition, the function information is supplied to the graphic data generating portion 86 and the main processing portion 88. Information of display data generated in the function setting process is supplied to the graphic data generating portion 86 through the function setting portion 84.

The coordinate managing portion 85 calculates the coordinates of each object corresponding to part origin information received from the part selecting portion 81 and position/size information received from the position/size setting portion 83, generates coordinate information, and manages each object with the coordinate information. In addition, the coordinate information generated by the coordinate managing portion 85 is supplied to the main processing portion 88. The main processing portion 88 performs a conventional process of the personal computer.

The graphic data generating portion 86 generates graphic data corresponding to the part information received from the part selecting portion 81, the position/size information received from the position/size setting portion 83, and the function information received from the function setting portion 84. The graphic data generated by the graphic data generating portion 86 is supplied to the drawing processing portion 87. The drawing processing portion 87 supplies the graphic data to the display unit 75.

Figure 5:
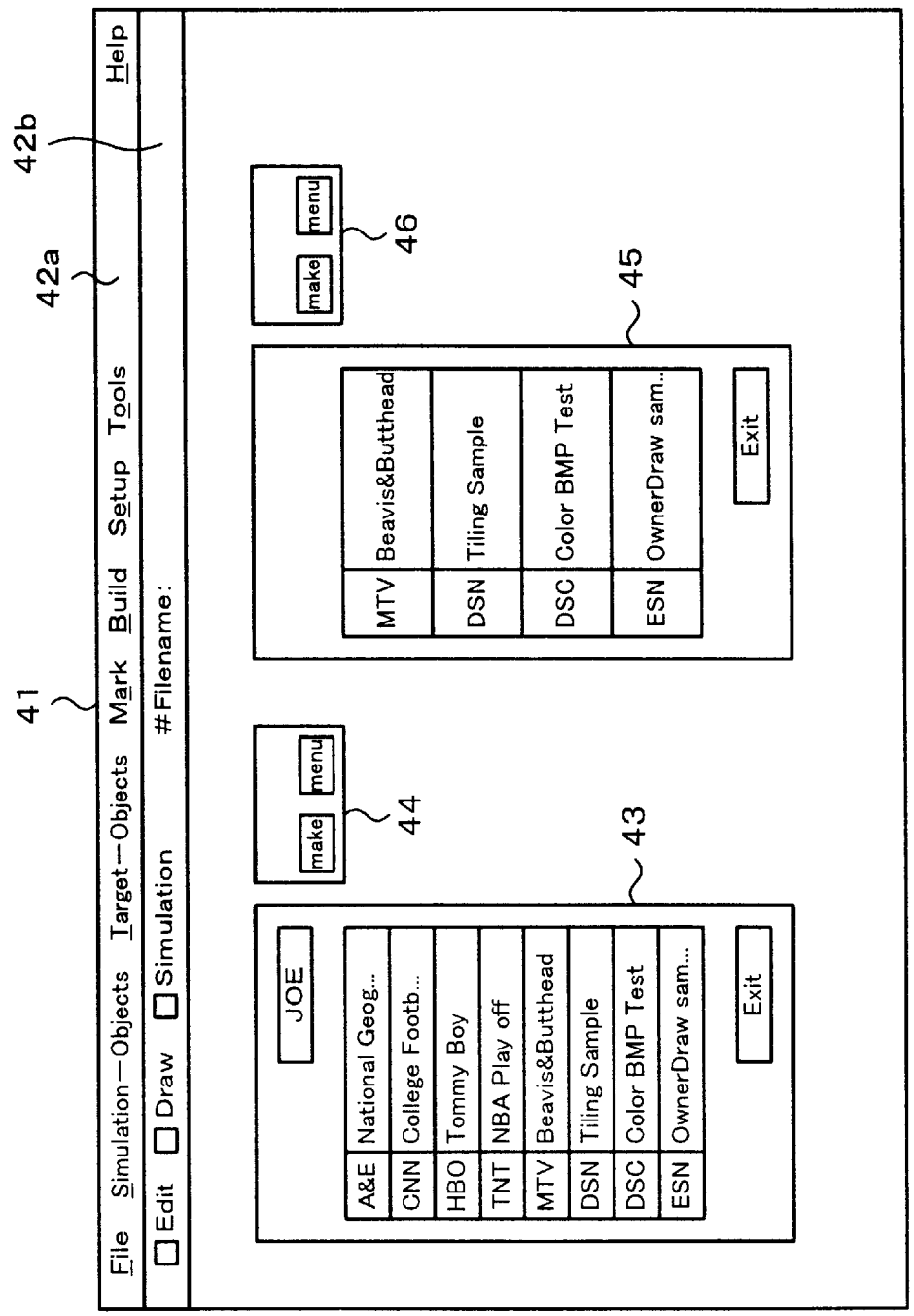
FIG. 5 is a schematic diagram showing an example of a screen according to the present invention.

FIG. 5 shows an example of the editing screen. In FIG. 5, reference numeral 41 is an editing screen. A function menu bar 42a and control buttons 42b are disposed at an upper portion of the editing screen 41. When the user clicks a particular portion of the menu bar 42a or the control button 42b with the mouse 77, the object editor screen is displayed and the editing mode (or another mode) is set.

In the example shown in FIG. 5, a plurality of objects 43 to be aggregated, a pair of aggregate objects 44, a plurality of objects 45, and a pair of aggregate objects 46 are displayed. Objects selected from the objects 43 are placed in the aggregate objects 44. Likewise, objects selected from the objects 45 are placed in the aggregate objects 46.

It should be noted that the present invention is not limited to the examples shown in FIGS. 3 and 5. Instead, the present invention can be applied to the case that each tag menu is aggregated. In other words, a menu screen composed of a plurality of objects is created for each tag. The created menu screens are aggregated as aggregate objects. Since a plurality of menu screens that have different tags overlap each other on the display unit, only the top tag menu screen is displayed. However, when tag menu screens are aggregated as an aggregate object, individual menu screens can be designed. Alternatively, individual menus on a menu operation tree can be treated as aggregate objects. Substances of individual menus can be placed in the aggregate objects.

According to the present invention, a program for displaying data is stored in a ROM of a personal computer disposed in an IRD (Integrated Receiver/Decoder). Instead of a ROM, an IC card, a RAM, or the like may be used. Alternatively, the program may be downloaded to the RAM of the IRD through a broadcast. The program can display the top menu of the IRD and each sub menu thereof. In reality, the top menu includes menus of a volume adjustment screen, a channel selection screen, an EPG screen, and so forth. These menu screens are individually created and aggregated as the top menu.

Figure 6:
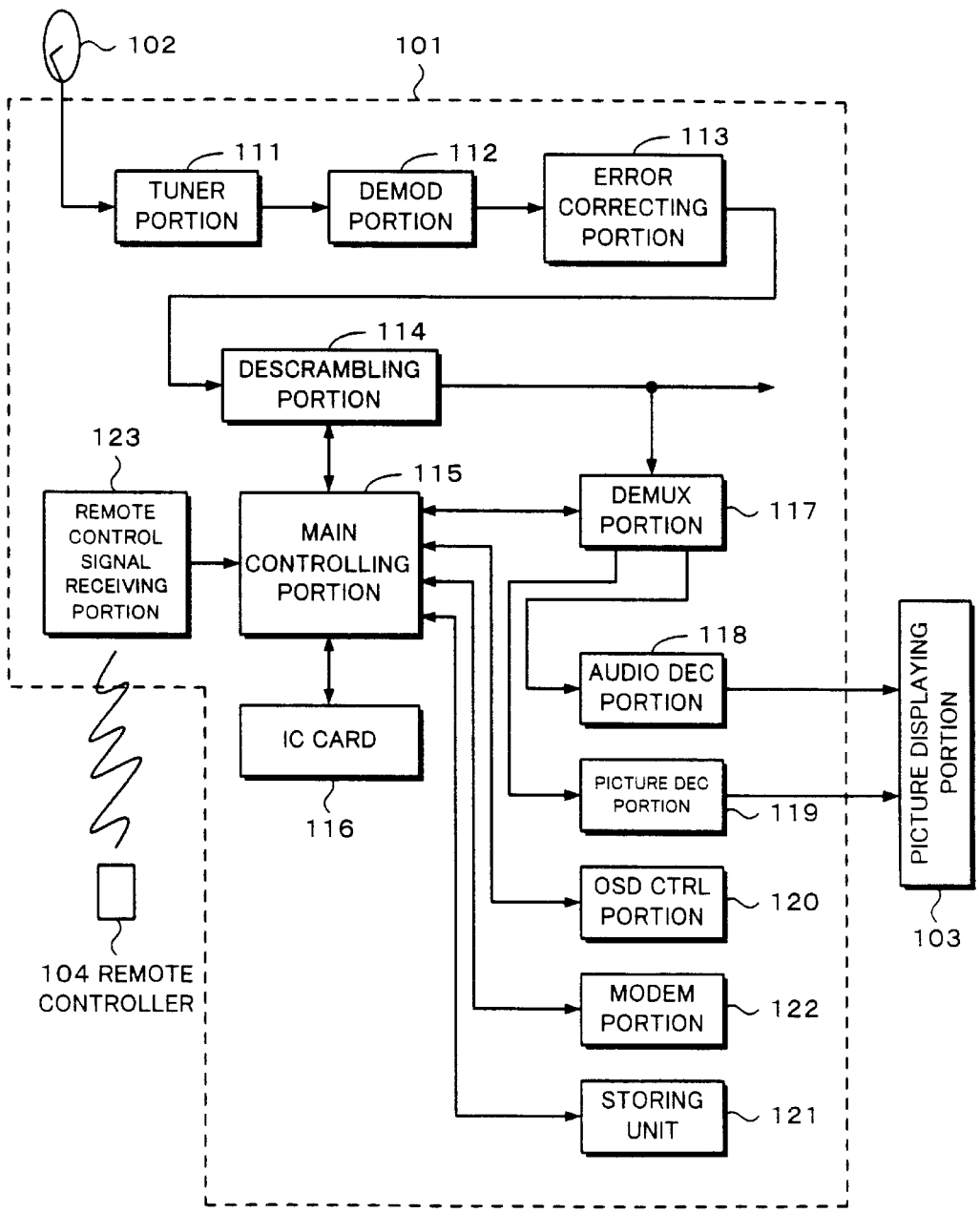
FIG. 6 is a block diagram showing a satellite broadcast receiving system according to the present invention.

Next, with reference to FIG. 6, an example of an IRD that uses a program created corresponding to the present invention will be described. FIG. 6 shows a receiving system. The receiving system comprises a receiving antenna 102, an IRD 101, a picture display unit 103, and an external controlling unit 104 (or a remote controller). A transmitting system (not shown) comprises a broadcasting station, an uplink system, a transmitting antenna, and a subscriber managing center. An orbiting communication satellite is equipped with transponders corresponding to the number of transport streams. The communication satellite receives a radio signal from the broadcasting station through the uplink system and the transmitting antenna, converts the frequency of the received signal, amplifies the resultant signal, and transmits the amplified signal to the receiving system.

The broadcasting station creates a program. A picture signal and an audio signal of the program are compression-encoded as a digital signal. The data sequence of the picture data and audio data is block-segmented. The block-segmented data is multiplexed with various data such as EMN (Entitled Management Message), ECM, EPG, or EIT on a time division basis and thereby a transport stream is formed. The multiplexed output signal is scrambled and encoded with error correction code for each packet. The resultant signal is modulated using QPSK (Quadrature Phase Shift Keying) or the like. The modulated output signal is transmitted to the communication satellite through the transmitting unit and the transmitting antenna.

A broadcast radio wave is transmitted from the transmitting antenna and received by the reception antenna 102 of each home through the communication satellite. The IRD 101 is connected to the reception antenna 102. The reception antenna 102 has an LNB (Low Noise Block down converter). The LNB converts the frequency of the received radio wave signal. The resultant signal is supplied to the IRD 101.

The IRD 101 comprises a tuner portion 111, a demodulating portion 112, an error correcting portion 113, a descrambling portion 114, a demultiplexing portion 117, a picture decoding portion 119, an audio decoding portion 118, and an OSD (On Screen Display) controlling portion 120. The tuner portion 111 selects a reception transponder. The descrambling portion 114 descrambles a scrambled signal. The demultiplexing portion 117 demultiplexes packets. The OSD controlling portion 120 controls a display screen.

Reference numeral 115 is a main controlling portion. The main controlling portion 115 controls all structural portions of the IRD 101. The main controlling portion 115 is composed of for example a microcomputer. The main controlling portion 115 is connected to an IC card 116, a demultiplexing portion 117, an OSD controlling portion 120, a storing unit 121, and a modem portion 122 through a data bus so as to bidirectionally exchange data therebetween.

The tuner portion 111 extracts a signal with a designated frequency from the received radio signal corresponding to a control signal received from the main controlling portion 115. The demodulating portion 112 demodulates a QPSK modulated signal. The demodulated output signal is supplied to the error correcting portion 113. The error correcting portion 113 corrects an error of a Viterbi encoded signal and decodes the resultant signal. The decoded output signal is supplied to the descrambling portion 114.

The main controlling portion 115 reads a descrambling key recorded in the IC card corresponding to EMN or ECM data. The main controlling portion 115 controls the descrambling portion 114 with the descrambling key. Thus, the descrambling portion 114 descrambles a scrambled signal and obtains a transport stream. The obtained transport stream is supplied to the demultiplexing portion 117.

The demultiplexing portion 117 demultiplexes packets on a desired channel from the transport stream. Packets of audio data are supplied to the audio decoding portion 118 corresponding to the control information. Packets of picture data are supplied to the picture decoding portion 119 corresponding to the control information. In addition, the main controlling portion 115 detects packets of such as EPG or EIT data.

When the transport stream contains packets of such as EPG or EIT data, the main controlling portion 115 temporarily stores packets of such as EPG or EIT data in the storing unit 121. The main controlling portion 115 extracts EPG or EIT data from the storing unit 121 corresponding to the operation state of the external controlling unit 104 and supplies the extracted data to the OSD controlling portion 120.

The audio decoding portion 118 decodes packets of audio data and converts the decoded audio data into analog data.

Thus, a received audio signal is obtained. The received audio signal is supplied to the picture display unit 103. Audio sound corresponding to the received audio data is generated by a speaker of the picture display unit 103. On the other hand, the picture decoding portion 119 decodes packets of picture data and converts the decoded picture data into analog data. Thus, a received picture signal is formed. The received picture signal is supplied to the OSD controlling portion 120.

The control signal is supplied from the main controlling portion 115 to the OSD controlling portion. When necessary, the OSD controlling portion 120 superimposes a menu screen on the picture signal. The resultant picture signal is supplied to the picture display unit 103. Pictures are displayed on the display portion of the picture display unit 103. When icons, menus, and so forth are used for displaying EPG and EIT information and searching data, the main controlling portion 115 controls the OSD controlling portion 120 so as to display icons and menus at a part of the display portion of the picture display unit 103.

In addition to each portion of the IRD, the main controlling portion 115 monitors the operation state of the external controlling unit (remote controller) 104. The main controlling portion 115 controls each portion with a control signal (that represents the operation state of the external controlling unit 104) received from the external control signal receiving portion 123.

As one of programs stored in the ROM of the main controlling portion 115 of the IRD 101, a software program created corresponding to the present invention can be used. The program defines layouts of the top menu and each menu. Each menu can be displayed on the picture display unit 103.

The present invention can be applied to a program for displaying a menu of the IRD as well as EPG thereof. In addition, the present invention can be applied to a unit that displays data on a screen as well as the IRD.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data generating method for designing software parts in a drawing area of a display and for generating a program for displaying the designed software parts, each of the designed software parts being associated with a respective tag screen, said method comprising:

aggregating the designed software parts as an aggregate object; and treating said aggregate object as one object such that when at least two of the designed software parts at least partially overlap each other in the drawing area of the display, the associated tag screens is concurrently displayed.

2. The data generating method as set forth in claim 1, further comprising:

displaying a desired number of said aggregate objects on the display.

3. The data generating method as set forth in claim 1, wherein said aggregate object has a size and a position on the display, and said size and said position are freely selectable.

4. The data generating method as set forth in claim 1, wherein said aggregate object is formed by selectively aggregating a plurality of the designed software parts.

5. The data generating method as set forth in claim 1, wherein the associated tag screen comprises a menu.

6. The data generating method as set forth in claim 5, wherein said menu includes a validating/invalidating function for the generation of data corresponding to a user's operation.

7. The data generating method as set forth in claim 5, further comprising:

aggregating menus corresponding to each of the designed software parts as an aggregate menu object; and treating said aggregate menu object as one menu object.

8. A recording medium from which a computer reads software information for designing software parts in a drawing area of a display and for generating a program for displaying the designed software parts, each of the designed software parts being associated with a respective tag screen, the software information comprising instructions for:

aggregating the designed software parts as an aggregate object; and treating said aggregate object as one object such that when at least two of the designed software parts at least partially overlap each other in the drawing area of the display, the associated tag screens is concurrently displayed.

9. The recording medium as set forth in claim 8, wherein the recording medium is a ROM.

10. The recording medium as set forth in claim 8, wherein the recording medium is an IC card.

11. A recording medium storing computer readable information for causing a processor in a computer controlled receiver to allow a user to design software parts in a drawing area of a display and to generate a program for displaying the designed software parts, each of the designed software parts being associated with a respective tag screen, the information comprising instructions for:

aggregating the designed software parts as an aggregate object; and treating said aggregate object as one object such that when at least two of the designed software parts at least partially overlap each other in the drawing area of the display, associated tag screens is concurrently displayed.

12. The recording medium as set forth in claim 11, further comprising:

receiving in the receiver a broadcast program comprising the computer readable information; and downloading the computer readable information to the recording medium.

* * * * *

UNITED STATES PATENT AND TRADEMARK OFFICE
CERTIFICATE OF CORRECTION

PATENT NO. : 6,542,172 B1
DATED : April 1, 2003
INVENTOR(S) : Katsuhiro Yamamoto It is certified that error appears in the above-identified patent and that said Letters Patent is hereby corrected as shown below:

Title page,
Insert Item -- [74] *Attorney, Lawyer, or Firm*—Lerner, David, Littenberg, Krumholz & Mentlik, LLP --.

Column 7,
Line 56, "is" should read -- are --.

Column 8,
Lines 33 and 52, "is" should read -- are --.

Signed and Sealed this

Thirtieth Day of September, 2003

JAMES E. ROGAN
*Director of the United States Patent and Trademark Office*